United States Patent
Aytug et al.

(10) Patent No.: US 12,461,051 B2
(45) Date of Patent: Nov. 4, 2025

(54) GAS SENSOR AND METHOD OF MANUFACTURE

(71) Applicant: UT-Battelle, LLC, Oak Ridge, TN (US)

(72) Inventors: Tolga Aytug, Oak Ridge, TN (US); Christine Fisher, Oak Ridge, TN (US); Pooran C. Joshi, Oak Ridge, TN (US); Robert J. Warmack, Oak Ridge, TN (US)

(73) Assignee: UT-BATTELLE, LLC, Oak Ridge, TN (US)

(*) Notice: Subject to any disclaimer, the term of this patent is extended or adjusted under 35 U.S.C. 154(b) by 364 days.

(21) Appl. No.: 18/118,920

(22) Filed: Mar. 8, 2023

(65) Prior Publication Data

US 2023/0288362 A1 Sep. 14, 2023

Related U.S. Application Data

(60) Provisional application No. 63/317,615, filed on Mar. 8, 2022.

(51) Int. Cl.
*G01N 27/12* (2006.01)
*B41M 3/00* (2006.01)

(52) U.S. Cl.
CPC ............. *G01N 27/127* (2013.01); *B41M 3/00* (2013.01)

(58) Field of Classification Search
CPC ..... G01N 27/127; G01N 27/126; B41M 3/00; Y02A 50/20
See application file for complete search history.

(56) References Cited

U.S. PATENT DOCUMENTS

| | | | |
|---|---|---|---|
| 7,875,455 B1* | 1/2011 | Li | G01V 9/00 436/28 |
| 2002/0003209 A1* | 1/2002 | Wood | H01J 49/0018 250/282 |
| 2010/0089772 A1 | 4/2010 | Deshusses et al. | |
| 2011/0300637 A1 | 12/2011 | Virji et al. | |
| 2015/0132857 A1* | 5/2015 | Belbruno | G01N 27/126 436/128 |
| 2017/0150659 A1* | 5/2017 | Uprety | H05K 9/0094 |
| 2021/0215636 A1* | 7/2021 | Claussen | G01N 33/5438 |
| 2021/0302347 A1 | 9/2021 | Hashizume | |
| 2022/0326168 A1* | 10/2022 | Belbruno | G01N 33/0073 |

FOREIGN PATENT DOCUMENTS

WO WO-2007119229 A1 * 10/2007 ............. C12Q 1/006

* cited by examiner

*Primary Examiner* — Francis C Gray
(74) *Attorney, Agent, or Firm* — WARNER NORCROSS + JUDD LLP

(57) ABSTRACT

A low-cost and low-power polyaniline-based (PANI) gas sensor is provided. The PANI-based gas sensor is formed on a flexible polyimide (PI) substrate using additive manufacturing techniques. The gas sensor can include silver interdigitated electrode (IDE) arrays and conducting polymeric sensing films (i.e., PANI) that are printed onto the PI substrate using a direct-write technology of aerosol-jet printing. Aerosol-jet printing enables high-resolution, non-contact deposition of both the electrode and chemically sensitive materials. The gas sensor is optionally capable of 5 ppm sensitivity and a sub-ppm detection limit.

16 Claims, 8 Drawing Sheets

GAS SENSOR AND METHOD OF MANUFACTURE

CROSS-REFERENCE TO RELATED APPLICATIONS

This application claims the benefit of U.S. Provisional Application 63/317,615, filed Mar. 8, 2022, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to chemiresistive gas sensors, and more particularly, to chemiresistive gas sensors incorporating polyaniline films.

BACKGROUND OF THE INVENTION

The Clean Air Act was amended in 1990 to include strategic ozone protection. Under these changes, "Class I" chlorofluorocarbons (CFCs) were phased out, which is currently being followed by the phasing out of "Class II" hydrochlorofluorocarbons (HCFCs), collectively known as Freon. A 99.5% reduction of HCFC production and consumption was mandated by 2020, and therefore, a pressing need exists for greener alternative to Freon. Compounding this issue, refrigerant gas leaks (e.g., ammonia) are one of the most common faults within commercial systems, accounting for an annual leakage rate between 11% and 30%. Management of these leaks not only results in significant economic loss, but also raises health and environmental concerns. For example, naturally derived substitutes such as hydrocarbons or ammonia can be toxic even below 50 parts per million (ppm) and/or flammable at concentrations of 15% to 28% by volume in air. Therefore, in the progression toward alternative refrigerants, it is highly desirable to develop a commercially viable leak detection system for improved economic and safety outcomes.

SUMMARY OF THE INVENTION

A low-cost and low-power polyaniline-based (PANI) gas sensor is provided. The PANI-based gas sensor is formed on a flexible polyimide (PI) substrate using additive manufacturing techniques. The gas sensor can include silver interdigitated electrode (IDE) arrays and conducting polymeric sensing films (i.e., PANI) that are printed onto the PI substrate using the direct-write technology of aerosol-jet printing. Aerosol-jet printing enables high-resolution, non-contact deposition of both the electrode and chemically sensitive materials. The gas sensor is optionally capable of 5 ppm sensitivity and a sub-ppm detection limit.

In one embodiment, the method of manufacture includes aerosol-jet printing a pair of conductive electrodes on a PI substrate and aerosol-jet printing a sensing film onto the conductive electrodes, the sensing film including PANI nanoparticles as an emeraldine salt. The conductive electrodes are interdigitated and can be formed of silver, gold, platinum, or palladium, by non-limiting example. The resulting gas sensor can be used to measure the concentration of a specified gas, for example ammonia, by comparing a measured electrical parameter of the gas sensor to a predetermined baseline electrical parameter.

In another embodiment, the conductive electrodes are not interdigitated and are instead disposed on opposing surfaces of the PANI-based sensing film as a multi-layer stack. For example, the PANI-based sensing film can be aerosol-jet printed onto a planar lower electrode. Once the PANI-based sensing film has cured, a mesh upper electrode can be aerosol-jet printed onto the PANI-based sensing film. The mesh upper electrode includes an open texture with spaced openings to allow the gas under investigation to contact the PANI-based sensing film. An optional reference electrode can be aerosol-jet printed adjacent the mesh upper electrode. The reference electrode is impervious to the gas under investigation and is otherwise dimensionally similar to the upper mesh electrode, such that and any drift in sensor performance can be corrected by evaluating the signals from the mesh electrode against signals from the reference electrode.

These and other embodiments provide an all-aerosol-printed PANI-based gas sensor capable of 5 ppm sensitivity and a sub-ppm detection limit. Because of the low power consumed by the sensor (typically microwatts or less), the approach described herein is also promising for the advancement of miniaturized multifunctional self-powered wireless sensor platforms to realize energy efficiency and cost-saving opportunities across a variety of end uses.

These and other features and advantages of the present invention will become apparent from the following description of the invention, when viewed in accordance with the accompanying drawings and appended claims.

DETAILED DESCRIPTION OF THE CURRENT EMBODIMENTS

The current embodiments include a method for manufacturing a PANI-based gas sensor. In various embodiments, the PANI-based gas sensor can be used for the detection of a specific gas or gases, for example ammonia, in a gaseous environment. As set forth below, the PANI-based gas sensor includes a nanoparticle film that is aerosol-jet printed onto interdigitated electrodes, for example electrodes formed of silver, gold, platinum, and palladium, the electrodes being supported by a flexible polyimide substrate. While primarily described herein as relating to the detection of ammonia, the PANI-based gas sensor can be used to detect other gases, including by non-limiting example methane, hydrogen sulfide, nitrogen dioxide, or water vapor.

Figure 1:
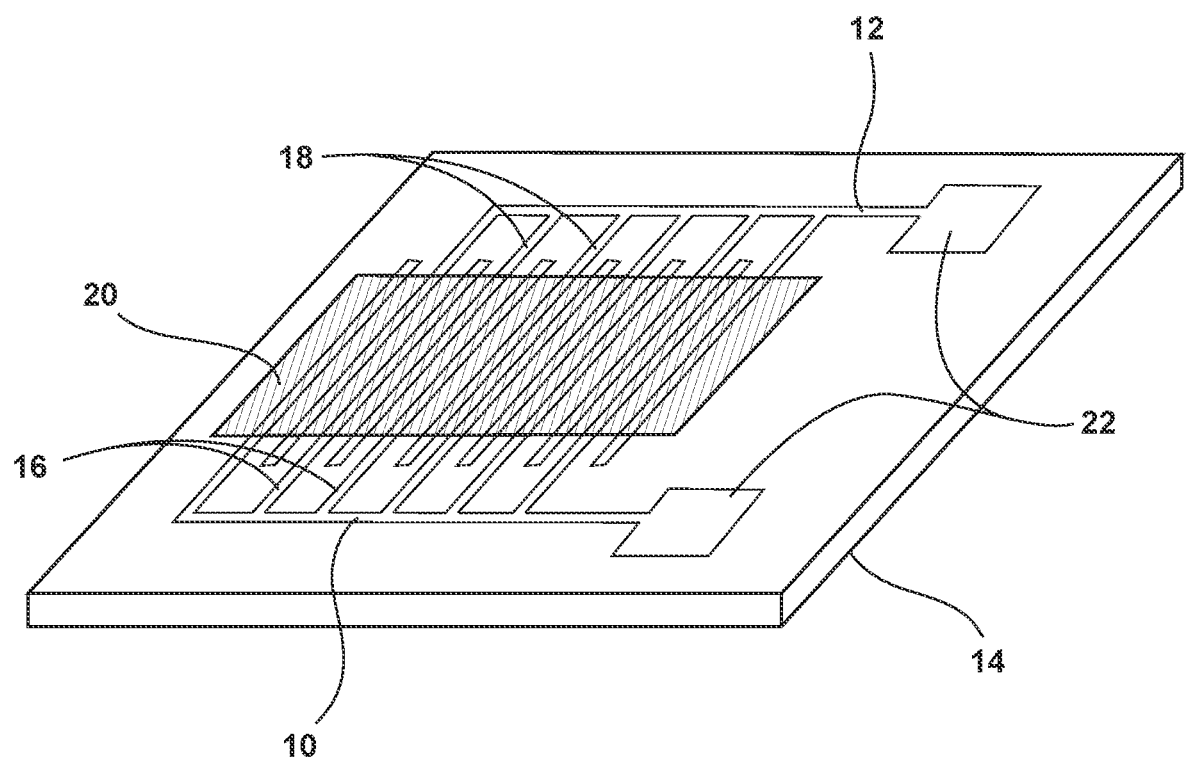
FIG. 1 illustrates a first example of a gas sensor formed in accordance with an embodiment of the present invention.

With reference to FIG. 1, the method includes forming a pair of conductive electrodes 10, 12 on a flexible or rigid dielectric substrate 14. This step generally includes aerosol-jet printing or screen printing first and second electrodes 10, 12 directly onto a polyimide substrate 14. Other substrates include paper, plastic, silicon, or glass (conductive substrates such as metal foil are also possible and are described below in connection with FIGS. 7-8). Each electrode 10, 12 can include a parallel array of interleaved fingers 16, 18, where each electrode is spaced apart from each other by a gap. The electrodes 10, 12 can be formed from a material that is not prone to oxidation, while being suitable for the gas under investigation. For example, the electrodes 10, 12 can be formed from silver (Ag) when detecting ammonia. Other metals include gold (Au), platinum (Pt), and palladium (Pd). The electrodes can have a finger width of 1 μm to 100 μm inclusive, for example 50 μm, with a gap of between 1 μm and 100 μm, for example 65 μm.

The method includes applying a PANI-based film 20 onto the electrodes 10, 12, such that the film 20 overlies and/or underlies the interdigitated fingers 16, 18 to bridge the gap between adjacent fingers 16, 18. The PANI-based film 20 includes PANI nanoparticles dispersed in a suspension which is aerosol-jet printed onto the electrodes 10, 12. The aerosol jets can achieve a linewidth of 10 microns or less, presenting greater spatial resolution that conventional inkjet and screen printing techniques, which have a lower limit of 30 microns. The nanoparticles can include nanofibers, for example, while other nanoparticles can be used in other embodiments.

Figure 2:
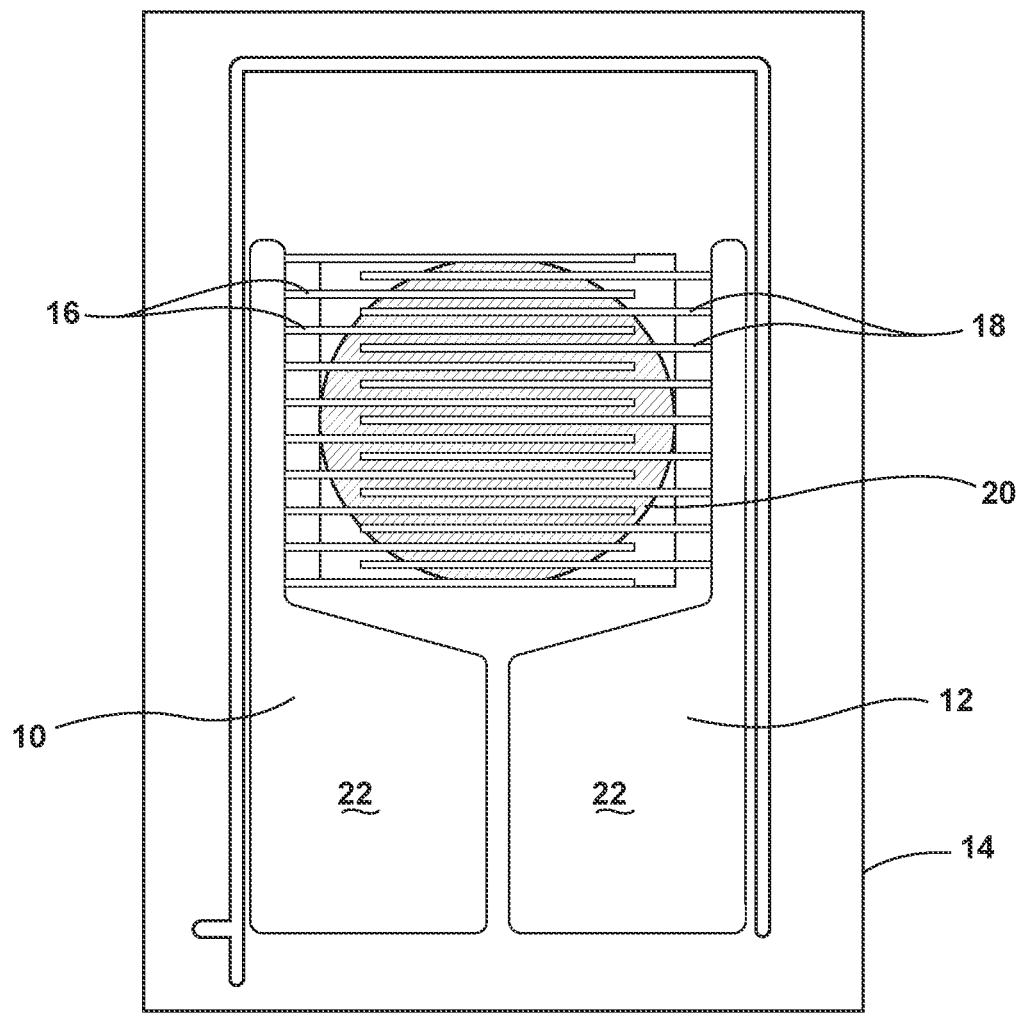
FIG. 2 illustrates a second example of a gas sensor formed in accordance with an embodiment of the present invention.

The mixture can be formed by dispersing PANI nanoparticles in a solvent such as water and sonicating the mixture. Once the film 20 has dried, either at room temperature or an elevated temperature, the film 20 can bridge the gap between the fingers of the interdigitated electrodes. Two examples are depicted in FIGS. 1 and 2. In FIG. 1, each electrode 10, 12 includes a contact pad 22 and a parallel array of conductive fingers 16, 18. The PANI-based film 20 overlies the interdigitated electrodes 10, 12, depicted as a rectangular deposit in FIG. 1 and underlies a circular deposit in FIG. 2. The actual deposition pattern may vary from application, however, as the PANI-based gas sensors of FIGS. 1 and 2 are merely provided for illustrative purposes. Further, in FIG. 1 both of the electrode pattern and the sensing film 20 can be deposited via aerosol-jet printing, offering line-width control down to 1 μm. By contrast, the electrode pattern in FIG. 2 can be processed by any suitable thin film deposition and patterning technique to achieve the desired line-width and thickness control atop the sensing film 20.

In these and other embodiments, the combination of polyaniline nanoparticle synthesis control and the direct-write printing technique of aerosol-jet printing enables the design of a gas sensor that consumes less than 1 milliwatt of power. In particular, the gas sensor can consume less than 1 μW of average power per reading by controlling the electrode gap and sensing film overlap, and by tailoring the conductivity of the nanoparticle-embedded PANI film. The PANI-based gas sensor is functionally a chemiresistor that operates based on a charge interaction between the molecules of a specific gas (e.g., ammonia) and the functionalization material (e.g., polyaniline nanoparticles) of the gas sensor. The resistance of the PANI-based gas sensor changes from a predetermined baseline value upon exposure to a gaseous environment containing the specific gas. This change in resistance can be measured as a ratio (e.g., $\Delta R/R$) or quantified in other respects, directly or indirectly, optionally as a change in current (or voltage) flowing through the sensor. This change in resistance is used to determine a gas concentration value, optionally with reference to a look-up table stored to computer readable memory. That is, the magnitude of the change in resistance is used to establish the concentration of the specific gas present in the gaseous environment.

To further illustrate the invention, the following laboratory example is provided, which is intended to be non-limiting.

A PANI-based ink was synthesized by sonicating 0.6 mL of aniline in 20 mL of deionized (DI) water for 30 minutes. In a 125 mL flask, 3 g of 70% (wt. %) dodecyl-benzene-sulfonic acid (DBSA) and isopropanol were added to the aniline suspension and stirred for 30 minutes. Once solvated, 0.36 g of ammonium persulfate was added to initiate an oxidative polymerization. The reaction was carried out at room temperature for 2.5 hours, resulting in an emeraldine salt polyaniline (ES-PANI) reaction mixture. To isolate PANI nanoparticles, the ES-PANI reaction mixture was then centrifuged at 5000 rpm for 30 minutes and the supernatant collected. Further nanoparticle separation was achieved via dialysis against DI water to remove unreacted oligomers, aniline, and excess DBSA, followed by 0.1 μm pore syringe filtration.

Silver interdigitated electrodes were aerosol-jet printed onto a polyimide substrate using an Optomec Aerosol Jet with the following parameters: nozzle print head size=150 μm; sheath gas flow=20 ccm; atomizer gas flow=40 ccm; atomizer current=0.4 mA; printing speed=4 mm/s; and line size=20 μm. The resulting electrodes included a finger width of 50 μm and a gap width of 65 μm. The polyimide substrate was cured at 102° C. for 10 minutes on a hot plate. Two coats of the PANI ink were then applied via the Optomec Aerosol Jet to form a circular film onto the electrodes, the film having a thickness of about 100 nm.

Figure 3:
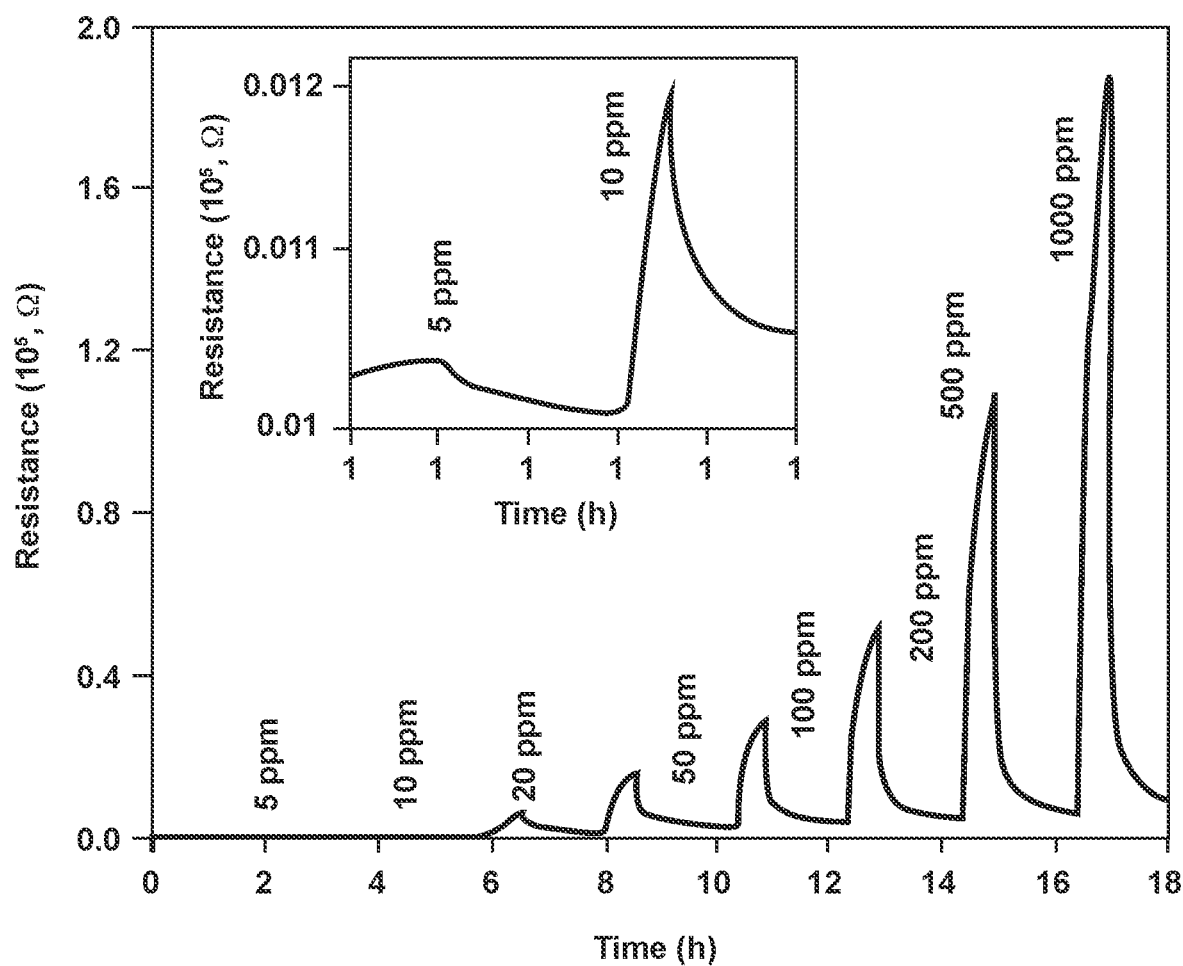
FIG. 3 is a graph illustrating the dynamic resistance of a PANI-based sensor over time.

The change in resistance of the aerosol-printed PANI-based sensor was evaluated at room temperature for a logarithmically ascending series of concentrations ranging from 5 ppm to 1000 ppm. The dynamic resistance transients of the PANI-based sensor are depicted in FIG. 3, with the inset showing the responses at 5 and 10 ppm of ammonia. Initially, the resistance of the PANI-based sensor was roughly 103Ω, increasing by over two orders of magnitude as ammonia levels increased to 1000 ppm. At 100 mV, the resistance resulted in very low power consumption—10 μW or less. The observed increase in resistance after exposure to ammonia is ascribed to the adsorption of the gas which triggers deprotonation of ES-PANI, progressively rendering the polymer non-conductive. Notably, the PANI-based sensor detected ammonia in ambient conditions at less than 5 ppm, which is comparable or better than any known sensors.

Figure 4:
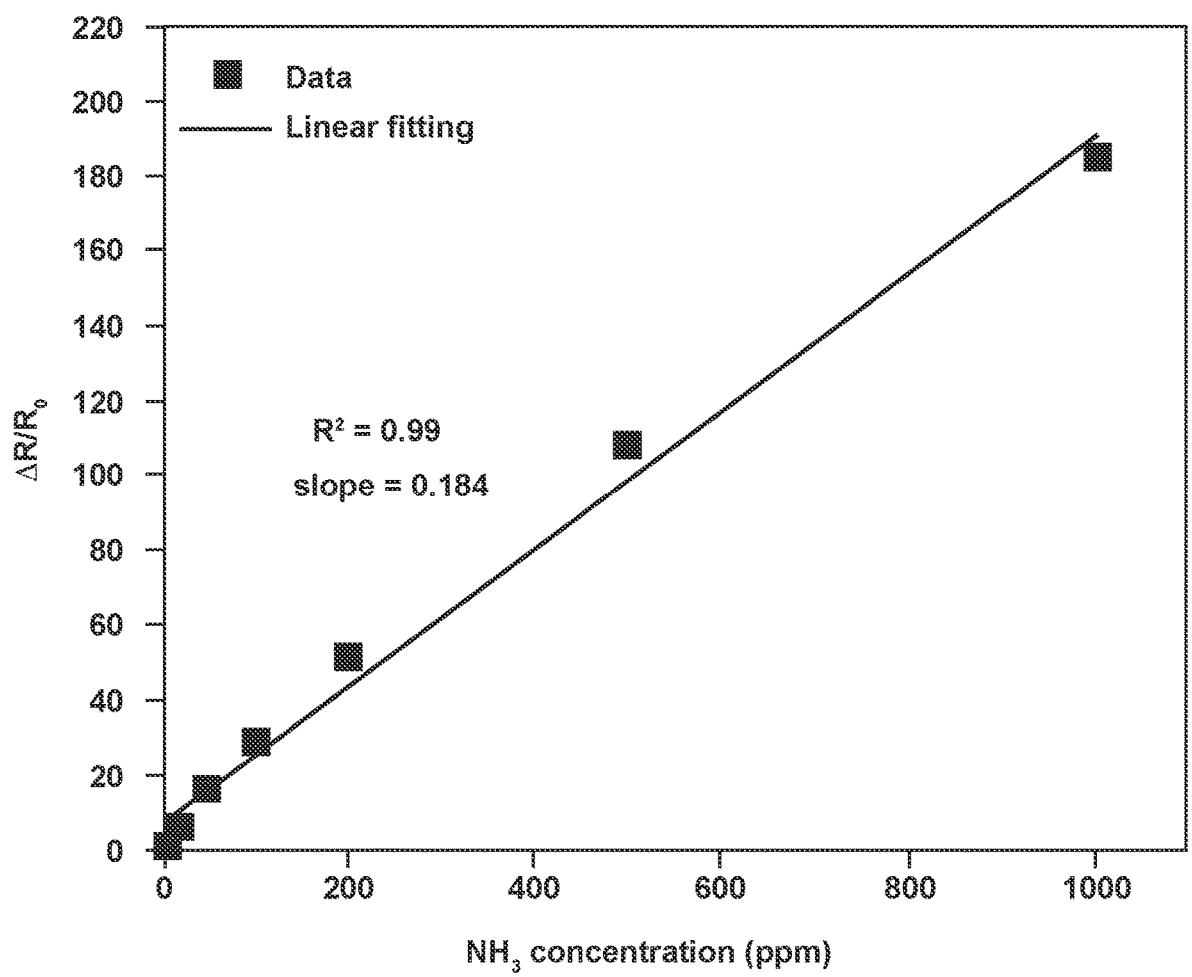
FIG. 4 is a graph illustrating the sensitivity of a PANI-based sensor under varying concentrations of ammonia.

The sensitivity of the PANI-based sensor is shown in FIG. 4. The response of the PANI-based sensor is the normalized change in resistance ($\Delta R/R$), which is plotted against the concentration of ammonia. The PANI-based sensor demonstrated a linear response (correlation coefficient, $R^2$ of 0.99) to higher ammonia concentrations. The observed linear relationship between the sensor response and gas concentration, coupled with a low detection limit, is highly valuable for the integration of low-cost, low-power sensors on thin polymer platforms.

Figure 5:
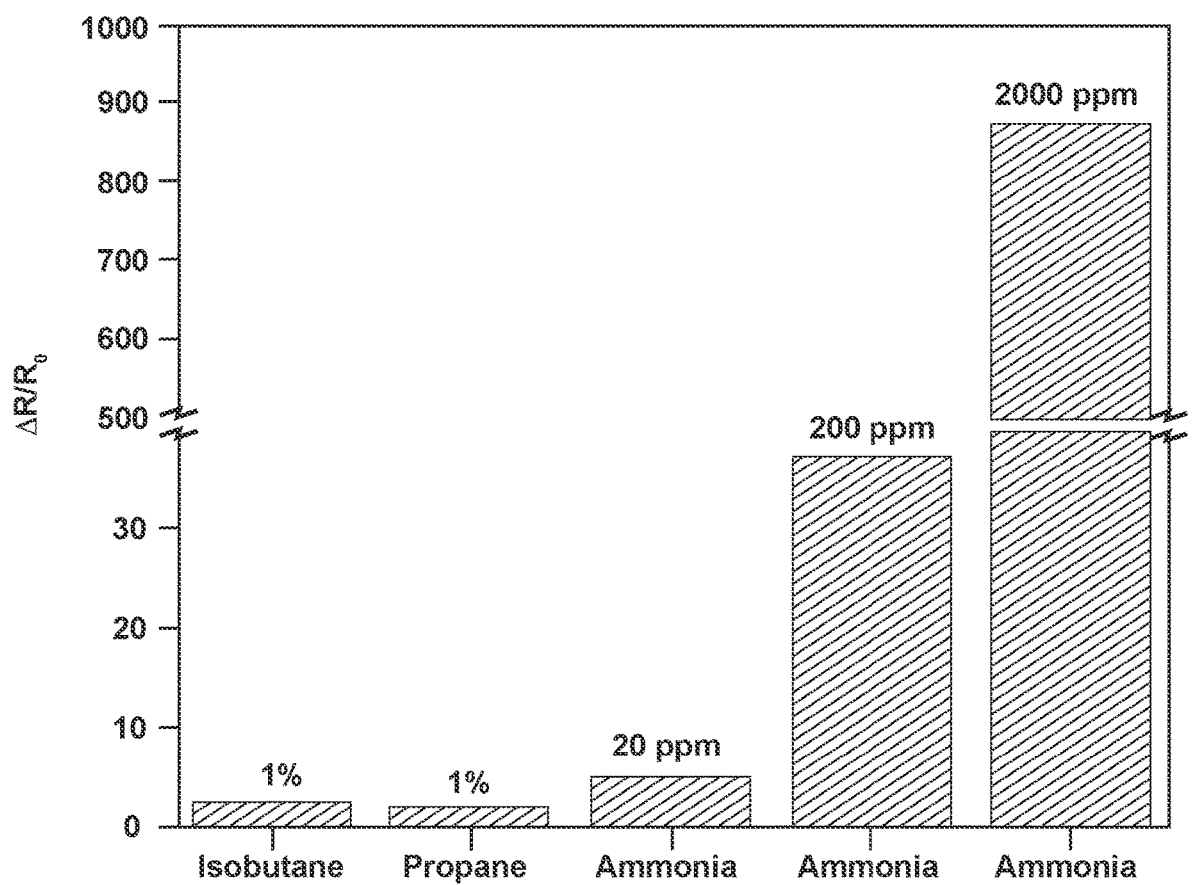
FIG. 5 is a graph illustrating the selectivity of a PANI-bases sensor toward selected hydrocarbon refrigerants.
Figure 6:
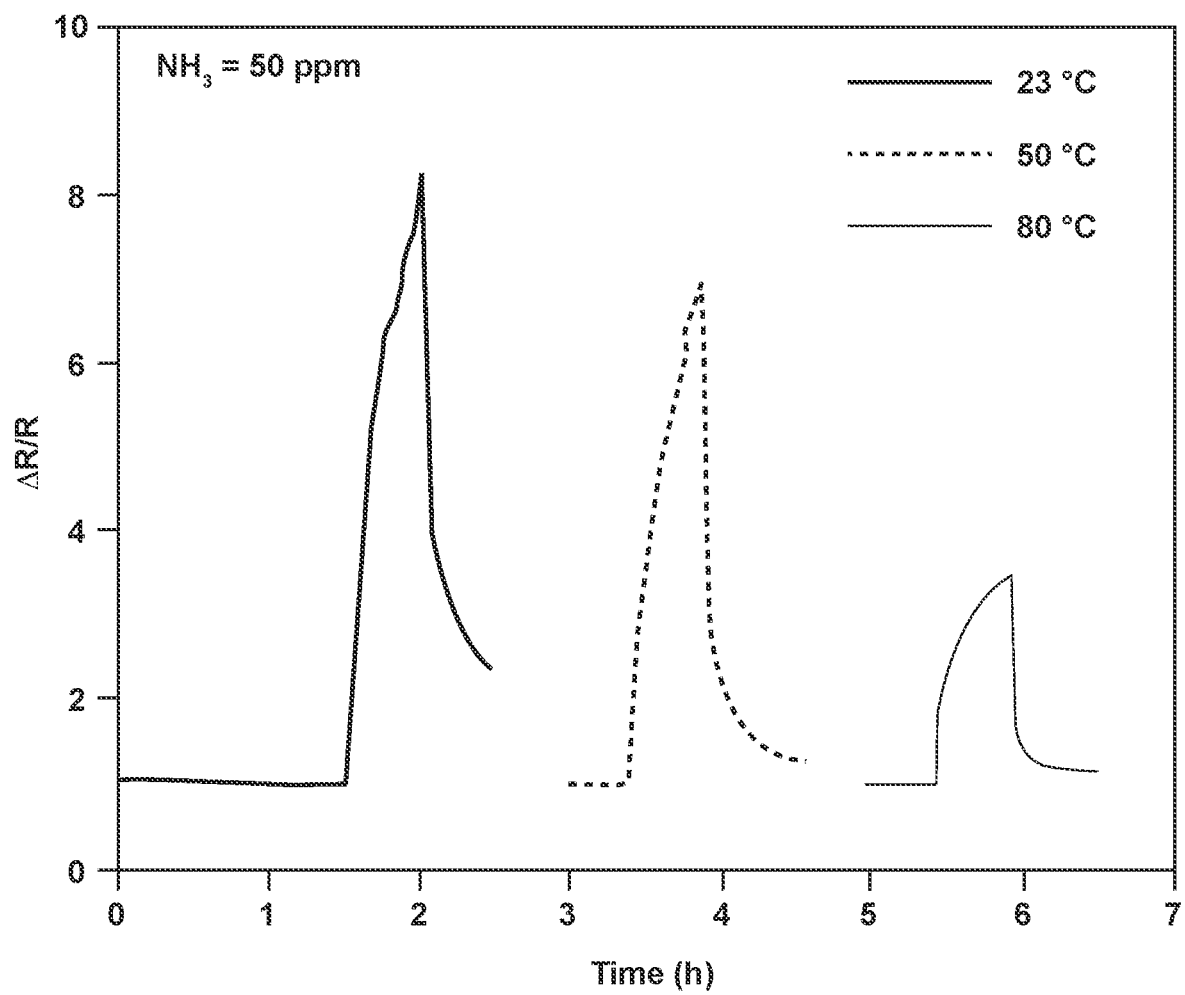
FIG. 6 is a graph illustrating the effect of operating temperature on sensor response to ammonia gas at fixed concentrations of 50 ppm.

The sensitivities of the PANI-based sensor toward other potentially interfering refrigerant gases including isobutene ($C_4H_{10}$) and propane ($C_3H_8$) at room temperature are shown in FIG. 5. The concentration of isobutene and propane were kept at a high level of 1% (i.e., 10,000 ppm) to enable detection. Sensor responses to lower ammonia concentrations are included for comparison. The PANI-based sensor demonstrated a specific response to ammonia gas, exhibiting at least three orders of magnitude higher selectivity relative to the other refrigerant gases. In addition, the effect of operating temperature on sensor performance is shown in FIG. 6 at a fixed concentration of 50 ppm of ammonia. ES-PANI is less thermally stable with respect to molecular changes than its undoped EB-PANI counterpart. ES-PANI reverts back to EB-PANI upon heating as the doping fraction decreases with increasing temperature. While the PANI-based sensor demonstrated operational functionality from ambient temperatures to 80° C., the sensor's sensitivity decreased as temperatures increased, as was expected. For example, at 80° C., the sensor was half as sensitive as operation at room temperature. However, the PANI-based sensor retained its functionality as a low-power, highly precise sensor for ammonia detection from 5 ppm to 2000 ppm.

Figure 7:
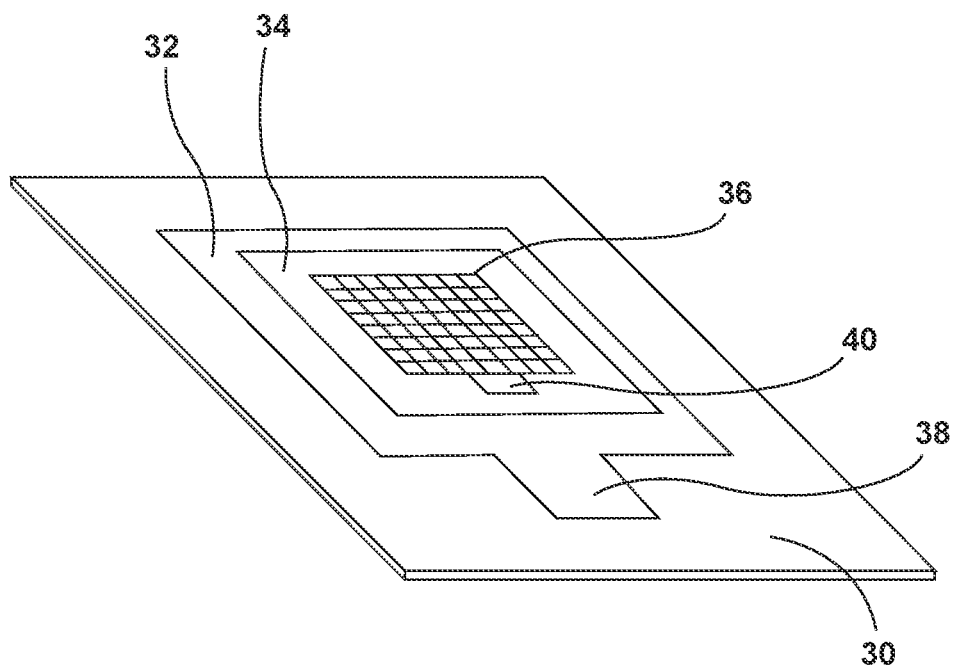
FIG. 7 illustrates a third example of a gas sensor formed in accordance with an embodiment of the present invention.
Figure 8:
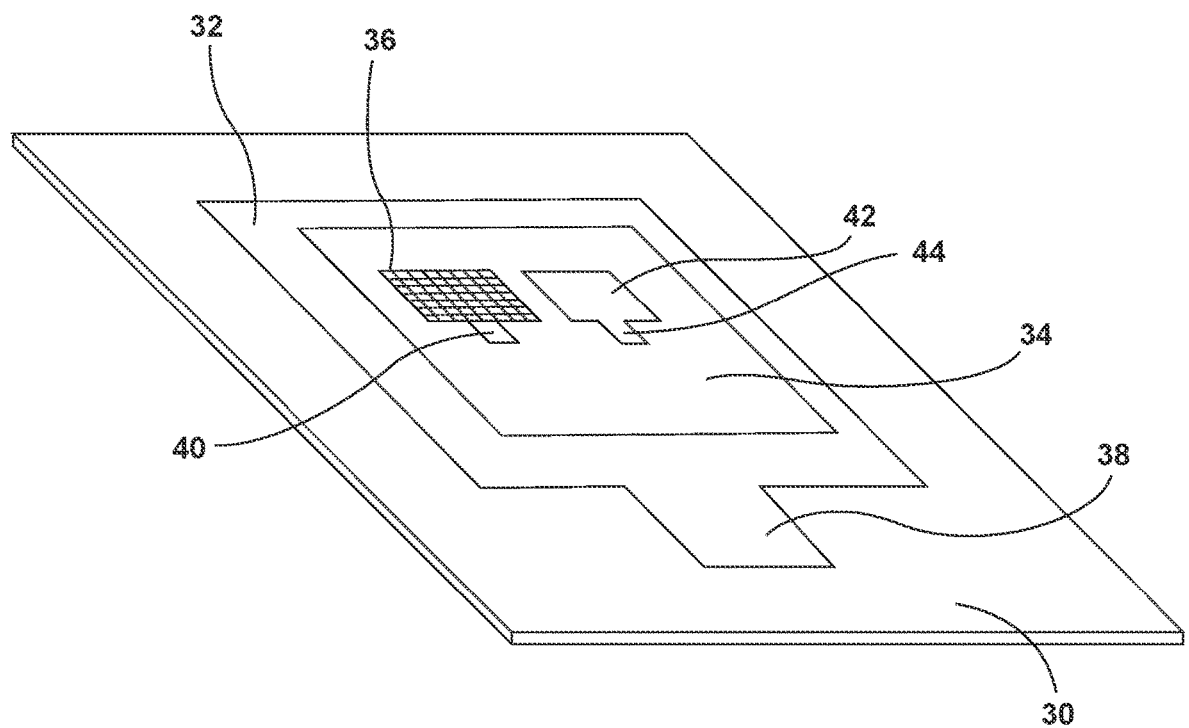
FIG. 8 illustrates a fourth example of a gas sensor formed in accordance with an embodiment of the present invention.

A further embodiment of the PANI-based gas sensor is illustrated in FIGS. 7-8. In this embodiment, the PANI-based gas sensor includes electrodes on opposing sides of a PANI sensing film as a multi-layer stack, rather than interdigitated electrodes. As shown in FIG. 7 for example, a planar bottom electrode 32 is formed on a rigid or flexible substrate 30, the bottom electrode 32 optionally being a metal foil applied to the substrate 30 or printed onto the substrate 30. The PANI sensing film 34 is then printed (e.g., aerosol-jet printed) onto to the bottom electrode 32. Once the PANI sensing film 34 has cured, the top electrode 36 is printed onto the PANI sensing film 34, for example by aerosol-jet printing the top electrode 36 onto the sensing film 34.

The top electrode 36 comprises a mesh (or other open texture with spaced openings) to allow gas to interact with the PANI sensing film 34. The top electrode 36 includes a smaller two-dimensional footprint than the bottom electrode 32, such that no portion of the top electrode 36 directly contacts the bottom electrode 32. Each electrode 32, 36 includes a respective contact pad 38, 40 for electrical connection to a circuit for measuring an electrical parameter of the gas sensor and for comparing the measured electrical parameter to a predetermined baseline electrical parameter to determine the concentration of a specified gas. The substrate 30 of FIG. 7 is a dielectric material, for example paper, plastic, silicon, or glass. Alternatively, the substrate 30 can be electrically conductive, for example metal foil, in which instance the bottom electrode 32 is omitted, and the substrate 30 is functionally a bottom electrode coupled to a measurement circuit.

As also shown in FIG. 8, the gas sensor can include a reference electrode for data calibration. In this embodiment, the mesh electrode 36 is laterally offset from a reference electrode 42. The reference electrode 42 is electrically isolated from the mesh electrode 36 and is non-penetrable with respect to the gas under investigation. The reference electrode 42 includes a contact pad 44 and can be co-printed with the mesh electrode 36 atop the PANI sensing film to have the same thickness and two-dimensional area as the mesh electrode 36, which can be important for proper sensor calibration. The PANI sensing film 34 between the reference electrode 42 and the bottom electrode 32 is not exposed to any gas, and any drift in the sensor performance can be corrected by evaluating the signals from the mesh sensor against the reference sensor.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A method for manufacturing a gas sensor, the method comprising:
providing a polyimide substrate;
aerosol-jet printing a pair of conductive electrodes on the polyimide substrate, each of the pair of conductive electrodes including a parallel array of interleaved fingers that are spaced apart from each other by a gap, the pair of conductive electrodes being formed from a metal including at least one of silver, gold, platinum, and palladium;
forming a mixture containing a plurality of polyaniline nanoparticles and a solvent and thereafter sonicating the mixture; and
aerosol-jet printing the mixture onto at least a portion the polyimide substrate and the pair of conductive electrodes to form a sensing film, such that the sensing film overlies the pair of conductive electrodes and bridges a gap between the pair of conductive electrodes, wherein the sensing film includes the plurality of polyaniline nanoparticles.

2. The method of claim 1, wherein:
the interleaved fingers have a width of 1 μm to 100 μm, inclusive; and
the gap between the pair of conductive electrodes is between 1 μm and 100 μm, inclusive.

3. The method of claim 1, wherein aerosol jet-printing the sensing film includes successive passes of an aerosol jet-printing nozzle to achieve a sensing film thickness of at least 80 nm.

4. The method of claim 1, wherein the plurality of polyaniline nanoparticles comprise an emeraldine salt.

5. The method of claim 1, wherein the plurality of polyaniline nanoparticles includes a plurality of polyaniline nanofibers.

6. The method of claim 1, wherein the sensing film extends over a sub-portion of the polyimide substrate, inward of an outer peripheral edge of the polyimide substrate.

7. The method of claim 1, wherein the sensing film overlies an interdigitated portion of the pair of conductive electrodes.

8. A gas sensor comprising:
a polyimide substrate having a pair of conductive metal electrodes formed thereon, the pair of conductive metal electrodes being formed from silver, gold, platinum, or palladium and defining a gap therebetween; and
a sensing film deposited onto at least a portion the polyimide substrate and the pair of conductive metal electrodes, such that the sensing film overlines the conductive metal electrodes and bridges the gap between the pair of conductive metal electrodes, wherein the sensing film includes a plurality of polyaniline nanoparticles.

9. The gas sensor of claim 8, wherein the pair of conductive metal electrodes are interdigitated.

10. A gas sensor comprising:
a polyimide substrate having a pair of conductive electrodes formed thereon, the pair of conductive electrodes defining a gap therebetween; and
a sensing film deposited onto at least a portion the polyimide substrate and the pair of conductive electrodes, such that the sensing film bridges the gap between the pair of conductive electrodes, wherein the sensing film includes a plurality of polyaniline nanoparticles, and wherein the sensing film is doped with a polymeric acid dopant.

11. The gas sensor of claim 8, wherein:
the pair of conductive metal electrodes include a plurality of interleaved fingers having a width of 1 µm to 100 µm inclusive; and
wherein the gap is between 1 µm and 100 µm, inclusive.

12. The gas sensor of claim 8, wherein the sensing film extends over a sub-portion of the polyimide substrate, inward of an outer peripheral edge of the polyimide substrate.

13. A method of detecting a gas, the method comprising:
providing a gas sensor, the gas sensor including:
a polyimide substrate having a pair of conductive metal electrodes formed thereon, the pair of conductive metal electrodes defining a gap therebetween, and
a sensing film deposited onto at least a portion the polyimide substrate and the pair of conductive metal electrodes, such that the sensing film bridges the gap between the pair of conductive metal electrodes, wherein the sensing film includes a plurality of polyaniline nanoparticles;
measuring an electrical resistance of the gas sensor when the gas sensor is exposed to a gaseous environment containing a specified gas; and
comparing the measured electrical resistance to a predetermined baseline electrical resistance to determine a concentration of the specified gas in the gaseous environment.

14. The method of claim 13, wherein the specified gas includes ammonia gas.

15. A method of forming a gas sensor, the method comprising:
forming a lower electrode on a polyimide substrate, the lower electrode being formed from a metal including at least one of silver, gold, platinum, and palladium;
forming a mixture containing a plurality of polyaniline nanoparticles and a solvent and thereafter sonicating the mixture;
aerosol-jet printing the mixture onto an upper surface of the lower electrode to form a sensing film, such that the sensing film overlies at least a portion of the lower electrode, the sensing film including the plurality of polyaniline nanoparticles; and
aerosol-jet printing an upper electrode onto an upper surface of the sensing film, the upper electrode being formed from a metal including at least one of silver, gold, platinum, and palladium, the upper electrode comprising a conductive mesh, such that the sensing film is interposed between the lower electrode and the upper electrode.

16. A method of forming a gas sensor, the method comprising:
forming a lower electrode on a dielectric substrate;
aerosol-jet printing a sensing film onto an upper surface of the lower electrode, the sensing film including a plurality of polyaniline nanoparticles;
aerosol-jet printing an upper electrode onto an upper surface of the sensing film, the upper electrode comprising a conductive mesh, such that the sensing film is interposed between the lower electrode and the upper electrode; and
forming a reference electrode onto the upper surface of the sensing film, the reference electrode being laterally offset from the upper electrode and impervious to a gas.

* * * * *